(12) United States Patent
Yu et al.

(10) Patent No.: US 9,806,906 B2
(45) Date of Patent: Oct. 31, 2017

(54) FLOODING PACKETS ON A PER-VIRTUAL-NETWORK BASIS

(75) Inventors: Shunjia Yu, San Jose, CA (US); Anoop Ghanwani, Rocklin, CA (US); Phanidhar Koganti, Sunnyvale, CA (US); Dilip Chatwani, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 385 days.

(21) Appl. No.: 13/044,301

(22) Filed: Mar. 9, 2011

(65) Prior Publication Data

US 2011/0299531 A1    Dec. 8, 2011

Related U.S. Application Data

(60) Provisional application No. 61/352,727, filed on Jun. 8, 2010, provisional application No. 61/427,050, filed on Dec. 23, 2010.

(51) Int. Cl.
*H04L 12/46* (2006.01)
*H04L 12/721* (2013.01)
(Continued)

(52) U.S. Cl.
CPC ...... *H04L 12/4641* (2013.01); *H04L 12/4625* (2013.01); *H04L 45/32* (2013.01);
(Continued)

(58) Field of Classification Search
CPC ... H04L 12/46–12/4695; H04L 45/00–45/748; H04L 49/20–49/358; H04L 63/0227–63/0272
See application file for complete search history.

(56) References Cited

U.S. PATENT DOCUMENTS

| | | |
|---|---|---|
| 5,390,173 A | 2/1995 | Spinney et al. |
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |

(Continued)

FOREIGN PATENT DOCUMENTS

| | | |
|---|---|---|
| CN | 102801599 A | 11/2012 |
| EP | 0579567 A2 | 1/1994 |

(Continued)

OTHER PUBLICATIONS

"Switched Virtual Internetworking moves beyond bridges and routers", Sep. 23, 1994, No. 12, New York, US.

(Continued)

*Primary Examiner* — Timothy J Weidner
(74) *Attorney, Agent, or Firm* — Shun Yao; Park, Vaughan, Fleming & Dowler LLP

(57) ABSTRACT

Methods and techniques for flooding packets on a per-virtual-network basis are described. Some embodiments provide a method (e.g., a switch) which determines an internal virtual network identifier based on one or more fields in a packet's header. Next, the method performs a forwarding lookup operation based on the internal virtual network identifier. If the forwarding lookup operation succeeds, the method can process and forward the packet accordingly. However, if the forwarding lookup operation fails, the method can determine a set of egress ports based on the internal virtual network identifier. Next, for each egress port in the set of egress ports, the method can flood the packet if a virtual network identifier in the packet's header is associated with the egress port. Flooding packets on a per-virtual-network basis can substantially reduce the amount of resources required to flood the packet when a forwarding lookup operation fails.

24 Claims, 5 Drawing Sheets

(51) Int. Cl.
*H04L 12/741* (2013.01)
*H04L 12/931* (2013.01)
*H04L 29/06* (2006.01)

(52) U.S. Cl.
CPC .............. *H04L 45/54* (2013.01); *H04L 45/66* (2013.01); *H04L 45/745* (2013.01); *H04L 49/208* (2013.01); *H04L 49/354* (2013.01); *H04L 63/0272* (2013.01)

(56) References Cited

U.S. PATENT DOCUMENTS

| | | | |
|---|---|---|---|
| 6,085,238 A | 7/2000 | Yuasa |
| 6,092,062 A | 7/2000 | Lohman |
| 6,104,696 A | 8/2000 | Kadambi |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,870,840 B1 | 3/2005 | Hill |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,768 B1 | 7/2008 | Betker |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 * | 7/2009 | Grosser et al. .......... 370/395.53 |
| 7,571,447 B2 | 8/2009 | Ally et al. |
| 7,599,901 B2 | 10/2009 | Mital |
| 7,688,736 B1 | 3/2010 | Walsh |
| 7,688,960 B1 | 3/2010 | Aubuchon et al. |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 * | 9/2010 | Ghosh et al. ................. 370/389 |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay et al. |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Venkataraman et al. |
| 8,462,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,599,850 B2 | 12/2013 | Jha |
| 8,599,864 B2 | 12/2013 | Chung |
| 8,615,008 B2 | 12/2013 | Natarajan |
| 8,619,788 B1 | 12/2013 | Sankaran |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,995,272 B2 | 3/2015 | Agarwal |
| 9,178,793 B1 | 11/2015 | Marlow |
| 9,350,680 B2 | 5/2016 | Thayalan |
| 9,401,818 B2 | 7/2016 | Venkatesh |
| 9,438,447 B2 | 9/2016 | Basso |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |

(56) References Cited

U.S. PATENT DOCUMENTS

| | | |
|---|---|---|
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0008868 A1 | 1/2004 | Bornowski |
| 2004/0010600 A1 | 1/2004 | Baldwin |
| 2004/0049699 A1 | 3/2004 | Griffith |
| 2004/0057430 A1 | 3/2004 | Paavolainen |
| 2004/0078469 A1* | 4/2004 | Ishwar et al. ............... 709/227 |
| 2004/0081171 A1 | 4/2004 | Finn |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1* | 6/2005 | Gross et al. ............... 370/395.2 |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0209886 A1 | 9/2006 | Silberman |
| 2006/0221960 A1* | 10/2006 | Borgione ............... 370/390 |
| 2006/0227776 A1 | 10/2006 | Chandrasekaran |
| 2006/0235995 A1* | 10/2006 | Bhatia et al. ............... 709/238 |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki et al. |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens et al. |
| 2008/0159260 A1 | 7/2008 | Vobbilisetty |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1* | 8/2008 | Seto et al. ............... 370/395.53 |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1* | 9/2008 | Melman et al. ............... 370/392 |
| 2008/0228897 A1 | 9/2008 | Ko |
| 2008/0240129 A1 | 10/2008 | Elmeleegy |
| 2008/0267179 A1* | 10/2008 | LaVigne et al. ............... 370/389 |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |

(56) References Cited

U.S. PATENT DOCUMENTS

| | | |
|---|---|---|
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal et al. |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1* | 6/2010 | Sajassi et al. ............... 370/401 |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0195489 A1 | 8/2010 | Zhou |
| 2010/0195529 A1 | 8/2010 | Liu |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1* | 9/2010 | Gupta et al. ............... 370/225 |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1* | 1/2011 | Mehta et al. ............... 370/401 |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1* | 9/2011 | Jha et al. ............... 370/242 |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee et al. |
| 2011/0286462 A1 | 11/2011 | Kompella |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1* | 12/2011 | Yu et al. ............... 370/252 |
| 2011/0299527 A1* | 12/2011 | Yu et al. ............... 370/390 |
| 2011/0299528 A1* | 12/2011 | Yu et al. ............... 370/390 |
| 2011/0299531 A1* | 12/2011 | Yu et al. ............... 370/392 |
| 2011/0299532 A1* | 12/2011 | Yu et al. ............... 370/392 |
| 2011/0299533 A1* | 12/2011 | Yu et al. ............... 370/392 |
| 2011/0299534 A1 | 12/2011 | Koganti |
| 2011/0299535 A1 | 12/2011 | Vobbilisetty |
| 2011/0299536 A1* | 12/2011 | Cheng et al. ............... 370/392 |
| 2011/0317559 A1 | 12/2011 | Kern |

(56) References Cited

U.S. PATENT DOCUMENTS

| | | |
|---|---|---|
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra et al. |
| 2012/0117438 A1 | 5/2012 | Shaffer |
| 2012/0131097 A1 | 5/2012 | Baykal et al. |
| 2012/0131289 A1 | 5/2012 | Taguchi et al. |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1* | 6/2012 | Terry et al. .................. 370/221 |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0287785 A1 | 11/2012 | Kamble |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0132296 A1 | 5/2013 | Koppenhagen |
| 2013/0135811 A1 | 5/2013 | Dunwoody |
| 2013/0136123 A1 | 5/2013 | Ge |
| 2013/0148546 A1 | 6/2013 | Eisenhauer |
| 2013/0156425 A1 | 6/2013 | Kirkpatrick |
| 2013/0194914 A1 | 8/2013 | Agarwal |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0250958 A1 | 9/2013 | Watanabe |
| 2013/0259037 A1 | 10/2013 | Natarajan et al. |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Udutha et al. |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315125 A1 | 11/2013 | Ravishankar |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0086253 A1 | 3/2014 | Yong |
| 2014/0105034 A1 | 4/2014 | Sun |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0241147 A1 | 8/2014 | Rajagopalan |
| 2014/0258446 A1 | 9/2014 | Bursell |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0355477 A1 | 12/2014 | Velayudhan et al. |
| 2015/0009992 A1 | 1/2015 | Zhang |
| 2015/0010007 A1 | 1/2015 | Matsuhira |
| 2015/0030031 A1 | 1/2015 | Zhou |
| 2015/0110111 A1 | 4/2015 | Song |
| 2015/0110487 A1 | 4/2015 | Fenkes |
| 2015/0127618 A1 | 5/2015 | Alberti |
| 2015/0143369 A1 | 5/2015 | Zheng |
| 2015/0172098 A1 | 6/2015 | Agarwal |
| 2015/0188753 A1 | 7/2015 | Anumala |
| 2015/0195093 A1 | 7/2015 | Mahadevan et al. |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |
| 2017/0026197 A1 | 1/2017 | Venkatesh |

FOREIGN PATENT DOCUMENTS

| | | |
|---|---|---|
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 12/2008 |
| EP | 2854352 | 4/2015 |
| EP | 2874359 | 5/2015 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2012033663 | 3/2012 |
| WO | 2012093429 | 7/2012 |
| WO | 2014031781 | 2/2014 |

OTHER PUBLICATIONS

Knight, S. et al. "Virtual Router Redundancy Protocol", Apr. 1998, XP-002135272.

(56) References Cited

OTHER PUBLICATIONS

Eastlake, Donald et al., "RBridges: TRILL Header Options", Dec. 2009.
Touch, J. et al., "Transparent Interconnection of Lots of Links (TRILL): Problem and Applicability Statement", May 2009.
Perlman, Radia et al., "RBridge VLAN Mapping", Dec. 2009.
Perlman, Radia et al., "RBridges: Base Protocol Specification", Mar. 2010.
"Switched Virtual Internetworking moved beyond bridges and routers", 8178 Data Communications Sep. 23, 1994, No. 12, New York.
S. Night et al., "Virtual Router Redundancy Protocol", Network Working Group, XP-002135272, Apr. 1998.
Eastlake 3rd., Donald et al., "RBridges: TRILL Header Options", Draft-ietf-trill-rbridge-options-00.txt, Dec. 24, 2009.
J. Touch, et al., "Transparent Interconnection of Lots of Links (TRILL): Problem and Applicability Statement", May 2009.
Perlman, Radia et al., "RBridge VLAN Mapping", Draft-ietf-trill-rbridge-vlan-mapping-01.txt, Dec. 4, 2009.
Perlman, Radia "Challenges and Opportunities in the Design of TRILL: a Routed layer 2 Technology", XP-002649647, 2009.
Nadas, S. et al., "Virtual Router Redundancy Protocol (VRRP) Version 3 for IPv4 and IPv6", Mar. 2010.
Perlman, Radia et al., "RBridges: Base Protocol Specification", draft-ietf-trill-rbridge-protocol-16.txt, Mar. 3, 2010.
Christensen, M. et al., "Considerations for Internet Group Management Protocol (IGMP) and Multicast Listener Discovery (MLD) Snooping Switches", May 2006.
Lapuh, Roger et al., "Split Multi-link Trunking (SMLT)", Oct. 2002.
Lapuh, Roger et al., "Split Multi-link Trunking (SMLT) draft-lapuh-network-smlt-08", 2008.
U.S. Appl. No. 12/312,903 Office Action dated Jun. 13, 2013.
U.S. Appl. No. 13/365,808 Office Action dated Jul. 18, 2013.
U.S. Appl. No. 13/365,993 Office Action dated Jul. 23, 2013.
U.S. Appl. No. 13/092,873 Office Action dated Jun. 19, 2013.
U.S. Appl. No. 13/184,526 Office Action dated May 22, 2013.
U.S. Appl. No. 13/184,526 Office Action dated Jan. 28, 2013.
U.S. Appl. No. 13/050,102 Office Action dated May 16, 2013.
U.S. Appl. No. 13/050,102 Office Action dated Oct. 26, 2012.
U.S. Appl. No. 13/044,301 Office Action dated Feb. 22, 2013.
U.S. Appl. No. 13/044,301 Office Action dated Jun. 11, 2013.
U.S. Appl. No. 13/030,688 Office Action dated Apr. 25, 2013.
U.S. Appl. No. 13/030,806 Office Action dated Dec. 3, 2012.
U.S. Appl. No. 13/030,806 Office Action dated Jun. 11, 2013.
U.S. Appl. No. 13/098,360 Office Action dated May 31, 2013.
U.S. Appl. No. 13/092,864 Office Action dated Sep. 19, 2012.
U.S. Appl. No. 12/950,968 Office Action dated Jun. 7, 2012.
U.S. Appl. No. 12/950,968 Office Action dated Jan. 4, 2013.
U.S. Appl. No. 13/092,877 Office Action dated Mar. 4, 2013.
U.S. Appl. No. 12/950,974 Office Action dated Dec. 20, 2012.
U.S. Appl. No. 12/950,974 Office Action dated May 24, 2012.
U.S. Appl. No. 13/092,752 Office Action dated Feb. 5, 2013.
U.S. Appl. No. 13/092,752 Office Action dated Jul. 18, 2013.
U.S. Appl. No. 13/092,701 Office Action dated Jan. 28, 2013.
U.S. Appl. No. 13/092,701 Office Action dated Jul. 3, 2013.
U.S. Appl. No. 13/092,460 Office Action dated Jun. 21, 2013.
U.S. Appl. No. 13/042,259 Office Action dated Mar. 18, 2013.
U.S. Appl. No. 13/042,259 Office Action dated Jul. 31, 2013.
U.S. Appl. No. 13/092,580 Office Action dated Jun. 10, 2013.
U.S. Appl. No. 13/092,724 Office Action dated Jul. 16, 2013.
U.S. Appl. No. 13/092,724 Office Action dated Feb. 5, 2013.
U.S. Appl. No. 13/098,490 Office Action dated Dec. 21, 2012.
U.S. Appl. No. 13/098,490 Office Action dated Jul. 9, 2013.
U.S. Appl. No. 13/087,239 Office Action dated May 22, 2013.
U.S. Appl. No. 13/087,239 Office Action dated Dec. 5, 2012.
U.S. Appl. No. 12/725,249 Office Action dated Apr. 26, 2013.
U.S. Appl. No. 12/725,249 Office Action dated Sep. 12, 2012.
Brocade Fabric OS (FOS) 6.2 Virtual Fabrics Feature Frequently Asked Questions, 2009.
Brocade Unveils "The Effortless Network", http://newsroom.brocade.com/press-releases/brocade-unveils-the-effortless-network--nasdaq-brcd-0859535, 2012.
Foundry FastIron Configuration Guide, Software Release FSX 04.2.00b, Software Release FWS 04.3.00, Software Release FGS 05.0.00a, Sep. 26, 2008.
FastIron and TurboIron 24X Configuration Guide Supporting FSX 05.1.00 for FESX, FWSX, and FSX; FGS 04.3.03 for FGS, FLS and FWS; FGS 05.0.02 for FGS-STK and FLS-STK, FCX 06.0.00 for FCX; and TIX 04.1.00 for TI24X, Feb. 16, 2010.
FastIron Configuration Guide Supporting Ironware Software Release 07.0.00, Dec. 18, 2009.
"The Effortless Network: HyperEdge Technology for the Campus LAN", 2012.
Narten, T. et al. "Problem Statement: Overlays for Network Virtualization", draft-narten-nvo3-overlay-problem-statement-01, Oct. 31, 2011.
Knight, Paul et al., "Layer 2 and 3 Virtual Private Networks: Taxonomy, Technology, and Standardization Efforts", IEEE Communications Magazine, Jun. 2004.
"An Introduction to Brocade VCS Fabric Technology", Brocade white paper, http://community.brocade.com/docs/DOC-2954, Dec. 3, 2012.
Kreeger, L. et al., "Network Virtualization Overlay Control Protocol Requirements", Draft-kreeger-nvo3-overlay-cp-00, Jan. 30, 2012.
Knight, Paul et al., "Network based IP VPN Architecture using Virtual Routers", May 2003.
Louati, Wajdi et al., "Network-based virtual personal overlay networks using programmable virtual routers", IEEE Communications Magazine, Jul. 2005.
Zhai F. Hu et al. "RBridge: Pseudo-Nickname; draft-hu-trill-pseudonode-nickname-02.txt", May 15, 2012.
Huang, Nen-Fu et al., "An Effective Spanning Tree Algorithm for a Bridged LAN", Mar. 16, 1992.
Office Action dated Jun. 6, 2014, U.S. Appl. No. 13/669,357, filed Nov. 5, 2012.
Office Action dated Feb. 20, 2014, U.S. Appl. No. 13/598,204, filed Aug. 29, 2012.
Office Action dated May 14, 2014, U.S. Appl. No. 13/533,843, filed Jun. 26, 2012.
Office Action dated May 9, 2014, U.S. Appl. No. 13/484,072, filed May 30, 2012.
Office Action dated Feb. 28, 2014, U.S. Appl. No. 13/351,513, filed Jan. 17, 2012.
Office Action dated Jun. 18, 2014, U.S. Appl. No. 13/440,861, filed Apr. 5, 2012.
Office Action dated Mar. 6, 2014, U.S. Appl. No. 13/425,238, filed Mar. 20, 2012.
Office Action dated Jun. 20, 2014, U.S. Appl. No. 13/092,877, filed Apr. 22, 2011.
Office Action dated Apr. 9, 2014, U.S. Appl. No. 13/092,752, filed Apr. 22, 2011.
Office Action for U.S. Appl. No. 13/598,204, filed Aug. 29, 2012, from Pascual Peguero, Natali, dated Feb. 20, 2014.
Office Action for U.S. Appl. No. 31/533,843, filed Jun. 26, 2012, from Lee, Chi Ho A., dated Oct. 21, 2013.
Office Action for U.S. Appl. No. 13/312,903, filed Dec. 6, 2011, from Qin, Zhiren, dated Nov. 12, 2013.
Office Action for U.S. Appl. No. 13/092,873, filed Apr. 22, 2011, from Patel, Parthkumar, dated Nov. 29, 2013.
Office Action for U.S. Appl. No. 13/184,526, filed Jul. 16, 2011, from Vu, Viet Duy, dated Dec. 2, 2013.
Office Action for U.S. Appl. No. 13/092,580, filed Apr. 22, 2011, from Kavleski, Ryan C., dated Jan. 10, 2014.
Office Action for U.S. Appl. No. 13/092,877, filed Apr. 22, 2011, from Patel, Parthkumar, dated Jan. 6, 2014.
Office Action for U.S. Appl. No. 13/425,238, filed Mar. 20, 2012, dated Mar. 6, 2014.
Office action dated Apr. 22, 2014, U.S. Appl. No. 13/030,806, filed Feb. 18, 2011.
Office Action for U.S. Appl. No. 13/092,752, filed Apr. 22, 2011, dated Apr. 9, 2014.
Office action dated Mar. 26, 2014, U.S. Appl. No. 13/092,701, filed Apr. 22, 2011.
Office action dated Mar. 14, 2014, U.S. Appl. No. 13/092,460, filed Apr. 22, 2011.

(56) References Cited

OTHER PUBLICATIONS

Office action dated Apr. 9, 2014, U.S. Appl. No. 13/092,724, filed Apr. 22, 2011.
Office action dated Mar. 27, 2014, U.S. Appl. No. 13/098,490, filed May 2, 2011.
Office Action for U.S. Appl. No. 13/598,204, filed Aug. 29, 2012, dated Feb. 20, 2014.
Office action dated Aug. 29, 2014, U.S. Appl. No. 13/042,259, filed Mar. 7, 2011.
Office Action for U.S. Appl. No. 13/092,877, filed Apr. 22, 2011, dated Sep. 5, 2013.
Office Action for U.S. Appl. No. 13/044,326, filed Mar. 9, 2011, dated Oct. 2, 2013.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
Office action dated Jun. 11, 2013, U.S. Appl. No. 13/044,301, filed Mar. 9, 2011.
Office action dated Feb. 22, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office Action for U.S. Appl. No. 13/365,993, filed Feb. 3, 2012, from Cho, Hong Sol., dated Jul. 23, 2013.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Office Action for U.S. Appl. No. 13/042,259, filed Mar. 7, 2011, from Jaroenchonwanit, Bunjob, dated Jan. 16, 2014.
Lapuh, Roger et al., 'Split Multi-link Trunking (SMLT) draft-lapuh-network-smlt-08', Jan. 2009.
Office Action for U.S. Appl. No. 13/351,513, filed Jan. 17, 2012, dated Feb. 28, 2014.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated Aug. 21, 2014, U.S. Appl. No. 13/184,526, filed Jul. 16, 2011.
Office action dated Aug. 4, 2014, U.S. Appl. No. 13/050,102, filed Mar. 17, 2011.
Office Action for U.S. Appl. No. 13/030,806, filed Feb. 18, 2011, dated Dec. 3, 2012.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/098,490, filed May 2, 2011, dated Mar. 27, 2014.
TRILL Working Group Internet-Draft Intended status: Proposed Standard RBridges: Base Protocol Specificaiton Mar. 3, 2010.
Office Action for U.S. Appl. No. 13/742,207, filed Jan. 15, 2013.
Office Action for U.S. Appl. No. 13/351,513, filed Jan. 17, 2012, dated Jul. 24, 2014.
Office Action for U.S. Appl. No. 13/087,239, filed Apr. 14, 2011, dated Dec. 5, 2012.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/556,061, filed Jul. 23, 2012, dated Jun. 6, 2014.
Office Action for U.S. Appl. No. 13/092,877, filed Apr. 22, 2011, dated Jun. 20, 2014.
Office Action for U.S. Appl. No. 13/092,873, filed Apr. 22, 2011, dated Jul. 25, 2014.
Office Action for U.S. Appl. No. 13/312,903, filed Dec. 6, 2011, dated Aug. 7, 2014.
Brocade 'An Introduction to Brocade VCS Fabric Technology', Dec. 3, 2012.
Office action dated Sep. 12, 2012, U.S. Appl. No. 12/725,249, filed Mar. 16, 2010.
Office action dated Apr. 26, 2012, U.S. Appl. No. 12/725,249, filed Mar. 16, 2010.
Office action dated Dec. 5, 2012, U.S. Appl. No. 13/087,239, filed Apr. 14, 2011.
Office action dated May 22, 2013, U.S. Appl. No. 13/087,239, filed Apr. 14, 2011.
Office action dated Dec. 21, 2012, U.S. Appl. No. 13/098,490, filed May 2, 2011.
Office action dated Jul. 9, 2013, U.S. Appl. No. 13/098,490, filed May 2, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office Action for U.S. Appl. No. 13/950,974, filed Nov. 19, 2010, from Haile, Awet A., dated Dec. 2, 2012.
Office action dated May 24, 2012, U.S. Appl. No. 12/950,974, filed Nov. 19, 2010.
Office action dated Mar. 4, 2013, U.S. Appl. No. 13/092,877, filed Apr. 22, 2011.
Office action dated Sep. 5, 2013, U.S. Appl. No. 13/092,877, filed Apr. 22, 2011.
Office action dated Jun. 7, 2012, U.S. Appl. No. 12/950,968, filed Nov. 19, 2010.
Office action dated Jan. 4, 2013, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada, 2000.
Office action dated Jun. 8, 2015, U.S. Appl. No. 14/178,042, filed Feb. 11, 2014.
Office action dated Oct. 2, 2014, for U.S. Appl. No. 13/092,752, filed Apr. 22, 2011.
Office Action dated Dec. 19, 2014, for U.S. Appl. No. 13/044,326, filed Mar. 9, 2011.

(56) References Cited

OTHER PUBLICATIONS

Office Action dated May 21, 2015, U.S. Appl. No. 13/288,822, filed Nov. 3, 2011.
Office action dated Apr. 30, 2015, U.S. Appl. No. 13/351,513, filed Jan. 17, 2012.
Office Action dated Apr. 1, 2015 U.S. Appl. No. 13/656,438, filed Oct. 19, 2012.
Office Action Dated Jun. 10, 2015, U.S. Appl. No. 13/890,150, filed May 8, 2013.
Kompella, Ed K. et al., 'Virtual Private LAN Service (VPLS) Using BGP for Auto-Discovery and Signaling' Jan. 2007.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/184,526, filed Jul. 16, 2011, dated Jan. 5, 2015.
Office Action for U.S. Appl. No. 13/425,238, filed Mar. 20, 2012, dated Mar. 12, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/786,328, filed Mar. 5, 2013, dated Mar. 13, 2015.
Office Action for U.S. Appl. No. 13/851,026, filed Mar. 26, 2013, dated Jan. 30, 2015.
Office Action for U.S. Appl. No. 14/577,785, filed Dec. 19, 2014, dated Apr. 13, 2015.
Rosen, E. et al., "BGP/MPLS VPNs", Mar. 1999.
Siamak Azodolmolky et al. "Cloud computing networking: Challenges and opportunities for innovations", IEEE Communications Magazine, vol. 51, No. 7, Jul. 1, 2013.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al., 2003.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 13/092,887, dated Jan. 6, 2014.
Office Action for U.S. Appl. No. 14/660,803, dated May 17, 2017.
Office Action for U.S. Appl. No. 14/488,173, dated May 12, 2017.
Office Action for U.S. Appl. No. 13/288,822, dated May 26, 2017.
Office Action for U.S. Appl. No. 14/329,447, dated Jun. 8, 2017.

\* cited by examiner

| TUPLE 306 | IVNID-01 |
|---|---|
| TUPLE 308 | IVNID-02 |

TUPLE-TO-IVNID MAPPING ON
RBRIDGE 106

| TUPLE 306 | IVNID-03 |
|---|---|
| TUPLE 308 | IVNID-04 |
| TUPLE 310 | IVNID-05 |

TUPLE-TO-IVNID MAPPING ON
RBRIDGE 108

| TUPLE 302 | IVNID-06 |
|---|---|
| TUPLE 304 | IVNID-07 |
| TUPLE 310 | IVNID-08 |

TUPLE-TO-IVNID MAPPING ON
RBRIDGE 110

| TUPLE 302 | IVNID-09 |
|---|---|
| TUPLE 304 | IVNID-10 |
| TUPLE 306 | IVNID-11 |
| TUPLE 308 | IVNID-11 |
| TUPLE 310 | IVNID-11 |

TUPLE-TO-IVNID MAPPING ON
RBRIDGE 102

| ALL | IVNID-12 |
|---|---|

TUPLE-TO-IVNID MAPPING ON
RBRIDGE 104

FIG. 3

FLOODING PACKETS ON A PER-VIRTUAL-NETWORK BASIS

RELATED APPLICATION

This application claims priority to U.S. Provisional Application No. 61/352,727, entitled "Per-VPN Flooding," filed 8 Jun. 2010, the contents of which are incorporated by reference herein.

This application also claims priority to U.S. Provisional Application No. 61/427,050, entitled "Flooding Packets on a Per-Virtual-Network Basis," filed 23 Dec. 2010, the contents of which are incorporated by reference herein.

BACKGROUND

Technical Field

This disclosure relates to data communication and networking More specifically, this disclosure relates to systems and techniques for flooding packets on a per-virtual-network basis.

Related Art

Computer networks have become critical elements of the information technology infrastructure. The insatiable demand for bandwidth and the ever increasing size and complexity of computer networks has created a need for increasing the bandwidth and improving manageability of computer networks.

The manageability of computer networks can be improved by using network virtualization. In network virtualization, a large and complex network can be arbitrarily carved up into multiple virtual networks to facilitate manageability. In some networks, a switch may flood a packet if a forwarding lookup operation for the packet fails. Unfortunately, flooding a packet in a network can consume a large amount of network resources.

SUMMARY

Some embodiments of the present invention provide systems and techniques for flooding packets on a per-virtual-network basis. During operation, a system (e.g., a switch) can receive a packet. Next, the system can determine an internal virtual network identifier based on one or more fields in a packet and/or a port on which the packet was received. The one or more fields in the packet can include, but is not limited to, a customer VLAN (Virtual Local Area Network) identifier, a service provider VLAN identifier, a source MAC (medium access control) address, a destination MAC address, an ingress RBridge (routing bridge) nickname, an egress RBridge nickname, and/or a Virtual Private Network (VPN) identifier. Packets from different virtual networks may be mapped to the same internal virtual network identifier. The system can then perform a forwarding lookup operation based on the internal virtual network identifier. If the forwarding lookup operation fails, the system can determine a set of egress ports based on the internal virtual network identifier. Next, the system can flood the packet over an egress port in the set of egress ports if a virtual network identifier (e.g., a VPN identifier) in the packet's header is associated with the egress port. In general, the virtual network identifier can include one or more fields in the packet that are used for identifying a virtual network. Note that flooding packets on a per-virtual-network basis can substantially reduce the amount of resources required to flood the packet when a forwarding lookup operation fails. Further, flooding packets on a per-virtual-network basis enables the network to keep traffic from different virtual networks separate. In this disclosure, unless otherwise stated, the phrase "based on" means "based solely or partly on."

In some embodiments, the system can determine the set of egress ports by first determining a multicast tree based on the virtual network identifier, and then determining the set of egress ports based on the multicast tree.

In some embodiments, the system can provide a copy of the packet to a set of egress ports. Next, each egress port can then use the VPN identifier to determine whether or not to flood the packet over the port. Specifically, each egress port can flood the packet over the port if the port is coupled to a network that includes hosts that are part of the VPN associated with the VPN identifier.

The virtual network identifier can generally refer to one or more fields in a packet that are used for determining which virtual network the packet belongs to. In some embodiments, the packet is a TRILL (Transparent Interconnection of Lots of Links) packet and the virtual network identifier is a VPN identifier. In some embodiments, the packet is a VLAN packet and the virtual network identifier is a VLAN identifier. In some embodiments, the virtual network identifier is a combination of one or more fields in the packet, e.g., the virtual network identifier may be a combination of one or more VLAN identifiers and/or a VPN identifier.

In some embodiments, the system can determine an internal virtual network identifier for a packet based on one of the following field combinations: (1) the MAC source address and the customer VLAN identifier, (2) customer VLAN identifier, (3) customer VLAN identifier and the service provider VLAN identifier, (4) service provider VLAN identifier, (5) customer VLAN identifier and the VPN identifier, and (6) the VPN identifier. In some embodiments, the system can map a TRILL packet to a default internal virtual network identifier, and then selectively flood the TRILL packet on each port associated with the default internal virtual network identifier based on the VPN identifier in the TRILL packet.

BRIEF DESCRIPTION OF THE FIGURES

FIG. 3 illustrates examples of mappings between packet header information and internal virtual network identifiers in accordance with some embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

TRILL (Transparent Interconnection of Lots of Links)

TRILL combines the advantages of bridging and routing. Bridges (e.g., devices that perform layer-2 forwarding) can transparently connect multiple links to create a single local area network. Without TRILL, bridges use the spanning tree protocol (STP) which restricts the topology on which traffic is forwarded to a tree to prevent loops. Unfortunately, forwarding the traffic over a tree causes traffic concentration on the links that correspond to the tree edges, leaving other links completely unutilized. Unlike bridges, Internet Protocol (IP) routers (e.g., devices that perform IP forwarding) do not need to create a spanning tree for forwarding traffic. However, routers that forward IP traffic require more configuration than bridges, and moving nodes in an IP network requires changing the IP address of the nodes. Each link in an IP network is associated with an address prefix, and all nodes on that link must have that IP prefix. If a node moves to another link that has a different IP prefix, the node must change its IP address. Unless otherwise stated, the term "IP" refers to both "IPv4" and "IPv6" in this disclosure.

A TRILL network includes "routing bridges" (referred to as RBridges) which route packets, but like bridges, learn layer-2 address locations through receipt of packets. Since packets are routed, packet forwarding is not limited to a spanning tree. Also, since a hop count is included in a TRILL packet, packets do not circulate forever in the network in the presence of loops. Further, since the layer-2 address locations are learned, a TRILL network allows IP nodes to move from one link to another in the network without any restrictions.

Figure 1:
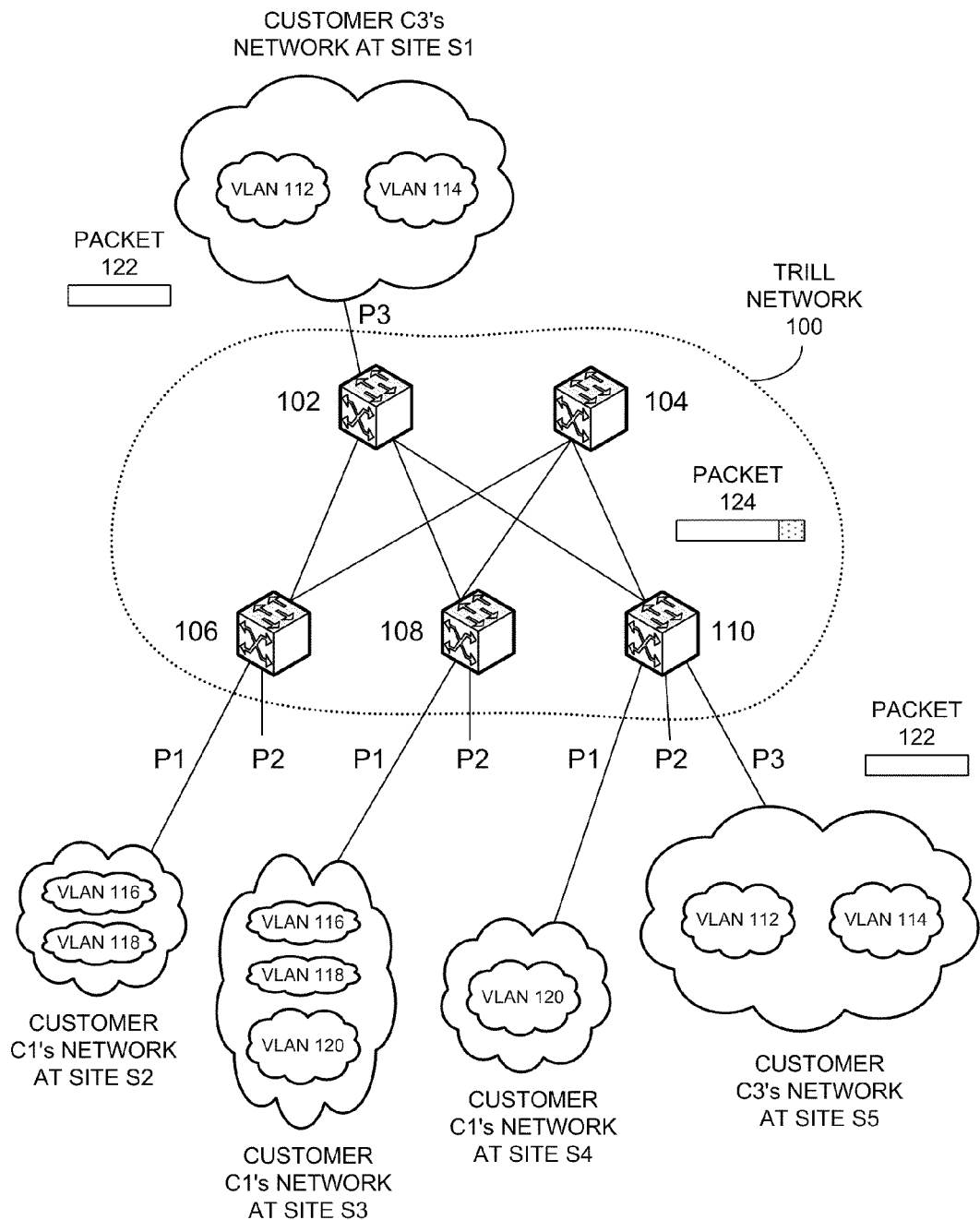
FIG. 1 illustrates a TRILL network in accordance with some embodiments of the present invention.

FIG. 1 illustrates a TRILL network in accordance with some embodiments of the present invention. TRILL network 100 can be a service provider's network which includes core RBridges 102 and 104 and edge RBridges 106, 108, and 110. RBridges 102, 106, 108, and 110 are coupled to customer devices, whereas RBridge 104 is not. Specifically, port P3 on RBridge 102 can be coupled to a device in customer C3's network at site S1; ports labeled P1 on RBridges 106, 108, and 110 can be coupled to devices in customer C1's networks at sites S2, S3, and S4, respectively; and port P3 on RBridge 110 can be coupled to a device in customer C3's network at site S5. Note that the port numbers in FIG. 1 match the customer numbers, i.e., ports labeled P1 are associated with customer C1, ports labeled P3 are associated with customer C3, etc. This has been done for ease of discourse. In general, any port on any RBridge can potentially be assigned to one or more virtual networks that are associated with one or more customers.

A virtual local area network (VLAN) in a customer's network may span multiple customer sites. For example, VLANs 112 and 114 in customer C3's network include nodes in sites S1 and S5. Similarly, VLANs 116 and 118 in customer C1's network include nodes in sites S2 and S3, and VLAN 120 in customer C1's network includes nodes in sites S3 and S4.

Nodes that belong to the same VLAN, but which are located at different sites, can communicate with each other transparently through TRILL network 100. Specifically, the ingress RBridge can encapsulate a packet (e.g., an Ethernet packet with or without one or more VLAN tags) received from a customer and route the packet within TRILL network 100 using a TRILL header. The egress RBridge can then strip the TRILL header and send the original customer packet on the appropriate port. For example, packet 122 can originate in customer C3's network at site S1, and be received on port P3 of RBridge 102 with a VLAN tag associated with VLAN 112. Next, RBridge 102, which is the ingress RBridge for this packet, can encapsulate packet 122 by adding a TRILL header to obtain packet 124 (the TRILL header is the shaded portion in packet 124). Next, the TRILL header of packet 124 can be used to route packet 124 through TRILL network 100 until packet 124 reaches RBridge 110, which is the egress RBridge for the packet. RBridge 110 can then strip away the TRILL header on packet 124 to obtain the original packet 122, and send packet 122 on port P3 so that the packet can be delivered to the intended destination in VLAN 112 in customer C3's network at site S5. In FIG. 1, the packet that is received at the ingress RBridge and the packet that is sent from the egress RBridge are shown to be the same. However, these packets can be different. For example, if VLAN translation is being performed, then the packet that is received at the ingress RBridge and the packet that is sent from the egress RBridge can have different VLAN tags.

Details of the TRILL packet format and RBridge forwarding can be found in IETF draft "RBridges: Base Protocol Specification," which is incorporated herein by reference.

Although some examples in this disclosure are presented in the context of a TRILL network that includes RBridges, the present invention is not limited to TRILL networks or RBridges. The terms "frame" or "packet" generally refer to a group of bits. The use of the term "frame" is not intended to limit the present invention to layer-2 networks. Similarly, the use of the term "packet" is not intended to limit the present invention to layer-3 networks. Unless otherwise stated, the terms "frame" or "packet" may be substituted with other terms that refer to a group of bits, such as "cell" or "datagram."

Network Virtualization

Network virtualization enables a service provider to provision virtual networks (VNs) over a common network infrastructure. To a user on a VN it appears as if the traffic is being carried over a separate network that has been specifically built for the user. However, in reality, the traffic from multiple VNs may be carried over a common network infrastructure.

Network virtualization has many uses. For example, network virtualization can be used to create multiple, logically distinct networks on the same physical network to comply with government regulations. Other uses of network virtualization include, but are not limited to, partitioning network resources between different organizations in a company thereby reducing network costs and simplifying network management.

One approach for addressing the problem that is solved by network virtualization is to duplicate resources (e.g., routers, switches, etc.) in the network so that the resources can be provisioned on a per-customer basis. However, this approach is impractical because it is costly and it is not scalable.

Some embodiments of the present invention implement network virtualization and/or partitioning in the TRILL network by embedding a VPN identifier in a TRILL option field in the TRILL header. Specifically, the ingress RBridge can determine a VPN identifier for each packet it receives from a customer, and embed the VPN identifier in a TRILL option field in the TRILL header. Next, the VPN identifier can be used to support network virtualization and/or partitioning in the TRILL network. Specifically, once the VPN identifier is embedded into the TRILL header, RBridges in the TRILL network can use the VPN identifier to determine how to handle the packet.

In some embodiments, the system can use a service provider VLAN identifier to implement network virtualization and/or partitioning. Specifically, ingress RBridges can add appropriate S-tags to packets received from customers (note that the S-tag based approach may not work for incoming packets that already have an S-tag). Next, the S-tag can be used to implement virtualization and/or partitioning in the network.

Packet Format

Figure 2:
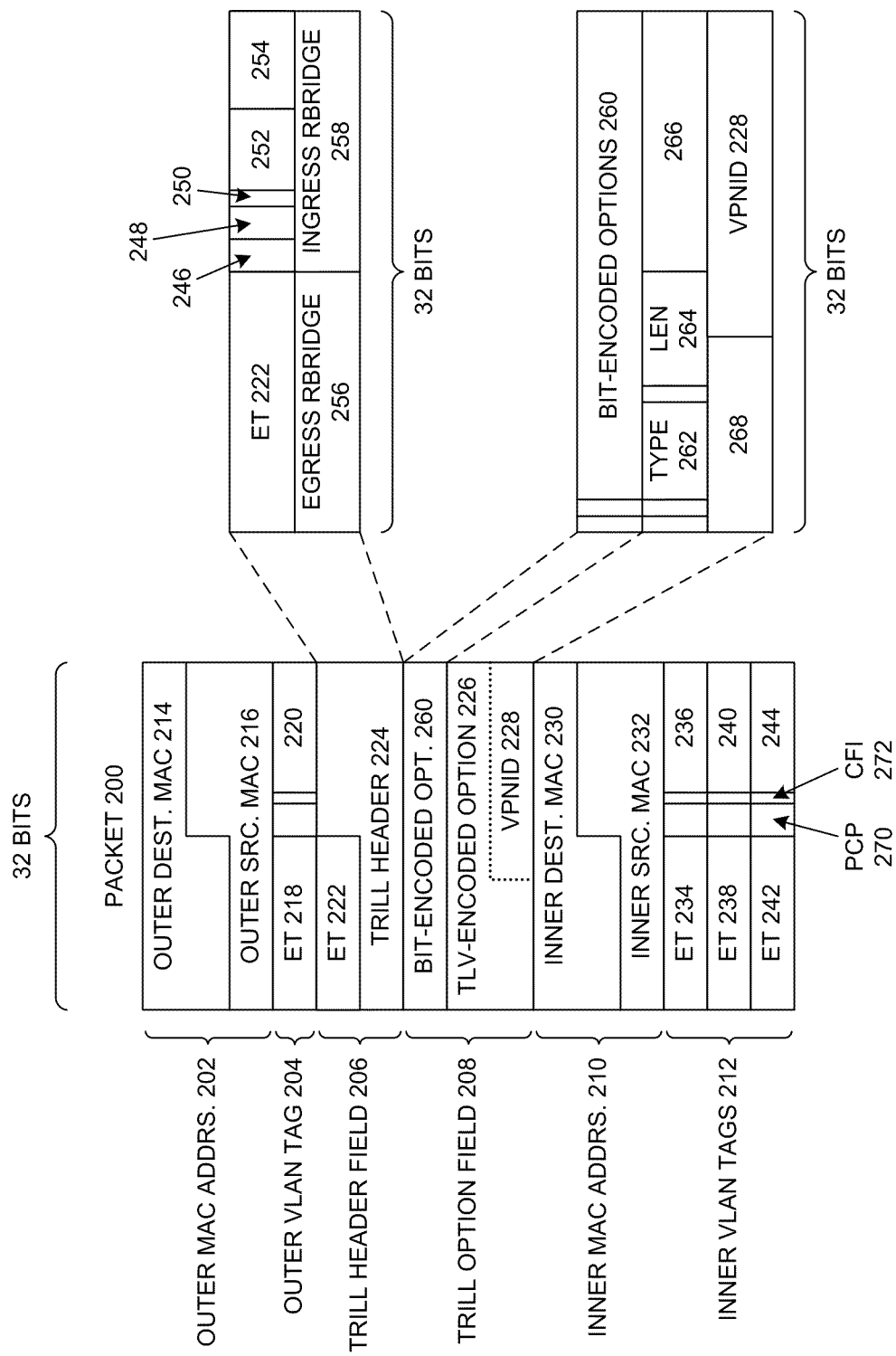
FIG. 2 illustrates a portion of an Ethernet packet which includes a TRILL header in accordance with some embodiments of the present invention.

FIG. 2 illustrates a portion of an Ethernet packet which includes a TRILL header in accordance with some embodiments of the present invention. The packet shown in FIG. 2 is for illustration purposes only, and is not intended to limit the present invention.

Packet 200 can include one or more of the following fields: outer MAC (medium access control) addresses 202, outer VLAN tag 204, TRILL header field 206, TRILL option field 208, inner MAC addresses 210, and inner VLAN tags 212. Typically, the packet is transmitted from top to bottom, i.e., the bits associated with outer MAC addresses 202 will appear on the transmission medium before the bits associated with outer VLAN tag 204 appear on the transmission medium, and so forth. The contents of these fields and their uses are discussed below.

Outer MAC addresses 202 can include outer destination MAC address 214 and outer source MAC address 216. These MAC addresses and outer VLAN tag 204 typically change at each TRILL hop as the packet traverses the service provider's network. Specifically, at each hop, outer source MAC address 216 is associated with the MAC address of the source node (e.g., RBridge) for that hop, outer destination MAC address 214 is associated with the MAC address of the destination node (e.g., RBridge) for that hop, and outer VLAN tag 204 is associated with the VLAN that includes the source node and the destination node for that hop.

Outer VLAN tag 204 can include Ethernet type field 218 and outer VLAN identifier 220. The value of Ethernet type field 218 can indicate that the next field is a VLAN identifier. VLAN identifier 220 can be used in the service provider's network to create multiple broadcast domains.

TRILL header field 206 can include Ethernet type field 222 and TRILL header 224. The value of Ethernet type field 222 can indicate that the next field is a TRILL header. TRILL header 224 can include information for routing the packet through a TRILL network that is embedded in the service provider's network. Specifically, as shown in FIG. 2, TRILL header 224 can include version field 246 which indicates the TRILL version, reserved field 248 which may be reserved for future use, multicast field 250 which indicates whether this packet is a multicast packet, TRILL option length 252 which indicates the length (in terms of 32-bit words) of any TRILL option field that follows the TRILL header, and hop count 254 which may be decremented at each RBridge as the packet traverses the service provider's network.

TRILL header 224 also includes egress RBridge nickname 256 and ingress RBridge nickname 258. Ingress RBridge nickname 258 corresponds to the ingress RBridge which receives the packet from the customer's network, and, for unicast packets, egress RBridge nickname 256 corresponds to the egress RBridge which sends the packet to the customer's network. For multicast packets, egress RBridge nickname 256 corresponds to the RBridge which is the root of the multicast tree on which the packet is to be forwarded. For example, in FIG. 1, when packet 122 is received at ingress RBridge 102, ingress RBridge 102 can use the header information in packet 122 to determine that packet 122 needs to be routed to egress RBridge 110. Next, ingress RBridge 102 can add TRILL header field 206 to packet 122 to obtain packet 124. Specifically, RBridge 102 can set ingress RBridge nickname 258 in packet 124's TRILL header to RBridge 102's nickname, and set egress RBridge nickname 256 in packet 124's TRILL header to RBridge 110's nickname. RBridge 102 can then forward packet 124 based solely or partly on packet 124's TRILL header.

TRILL option field 208 can include bit-encoded options and one or more options encoded in a TLV (type-length-value) format. Specifically, TRILL option field 208 can include bit-encoded options 260 which are one-bit option flags, and TLV-encoded option 226. For example, a 20-bit VPN identifier can be encoded as a TLV-encoded option. Specifically, the value of type field 262 can indicate that this option specifies a VPN identifier. Length field 264 can indicate the length of the data portion of the TLV-encoded option in octets. In the packet shown in FIG. 2, TLV-encoded option 226 is used for specifying a 20-bit VPN identifier, and length field 264 is set to the value 0x6. The data portion of TLV-encoded option 226 begins immediately after length field 264. Specifically, in the packet shown in FIG. 2, the total length (in octets) of fields 266, 268, and 228 is equal to 0x6 as specified by length field 264. Further, as shown in FIG. 2, the last 20 bits of the data portion in TLV-encoded option 226 can be used for specifying VPN identifier 228.

Note that a 20-bit VPN identifier can be specified using a smaller data portion, e.g., only 0x3 octets instead of 0x6 octets. However, some embodiments use the following non-obvious insight: it may be desirable to align the 20-bit VPN identifier with the word boundary to simplify chip design and/or to improve performance. Thus, in some embodiments, 0x6 octets are used instead of 0x3 octets so that the 20-bit VPN identifier is aligned with a 32-bit word boundary. For example, as shown in FIG. 2, VPN identifier 228 is aligned with the 32-bit word boundary.

Inner MAC addresses 210 can include inner source MAC address 232 and inner destination MAC address 230. Inner MAC addresses 210 can be the MAC addresses that were present in the header of the packet that was received from the customer's network. For example, in FIG. 1, suppose a source node in VLAN 112 in customer C3's network at site S1 sends a packet to a destination node in VLAN 112 in customer C3's network at site S5. In this scenario, inner source MAC address 232 can correspond to the source node at site S1, and inner destination MAC address 230 can correspond to the destination node at site S5.

Inner VLAN tags 212 can include one or more VLAN tags. For example, inner VLAN tags 212 can include an S-tag which includes Ethernet type field 234 and S-VLAN-identifier 236, a C-tag which includes Ethernet type field 238 and C-VLAN-identifier 240, and another tag which includes Ethernet type field 242 and VLAN identifier 244. Each VLAN tag in outer VLAN tag 204 and inner VLAN tags 212 can also include a three-bit Priority Code Point (PCP) field (also referred to as the "priority" or "priority bits" in this disclosure), e.g., PCP 270, and a one-bit CFI field, e.g., CFI 272. When an S-tag is used, the CFI field can carry a drop eligibility indicator (DEI) bit. The values in Ethernet type fields (e.g., 234, 238, and 242) can indicate the type of VLAN tag that follows. For example, Ethernet type field 234 and 238 can indicate a VLAN identifier for an S-tag and a VLAN identifier for the C-tag follow the respective Ethernet type fields. The S-tag and the C-tag can be used by the customer to create a stacked-VLAN architecture, e.g., as defined in the Provider Bridging standard. The S-tag may also be used by the service provider to implement network virtualization and/or partitioning. Packet 200 can also include other tags, each tag having a tag-type field which indicates the type of the tag, and a field that stores contents (e.g., an identifier) related to the tag. For example, packet 200 can include a 32-bit congestion-notification-tag (CN-tag) which includes a 16-bit tag-type field and a 16-bit flow-identifier. The congestion-notification-tag may be used by the customer to manage network congestion.

Note that a packet may or may not include all of the fields shown in FIG. 2. For example, in some embodiments, a packet may not include one or more of inner VLAN tags 212 and/or outer VLAN tag 204. Further, certain combinations of fields may not be allowed in some embodiments. For example, in some embodiments, a packet may include either an S-tag or a TRILL option field, but not both. Additionally, the values of some fields may be related to each other. For example, in some embodiments, S-VLAN-identifier 236 may be copied into the 12 least significant bits of VPNID 228.

VLAN tagging is specified in IEEE (Institute of Electrical and Electronics Engineers) standard IEEE 802.1Q. The earlier versions of the standard, including and up to IEEE 802.1Q-2005 of this standard describes how a single VLAN tag can be added to an Ethernet packet to create multiple broadcast domains within the same local area network (LAN). The term Provider Bridging refers to an amendment of this standard which allows an S-tag (a service VLAN tag is sometimes referred to as a provider tag) to be stacked in a single Ethernet packet. Provider Bridging enables a service provider to carry VLAN traffic from multiple customers on a shared network infrastructure without restricting the VLAN address space available to each customer. Further details on Provider Bridging can be found in the specification for standard IEEE 802.1ad.

In some embodiments, the system can add a TRILL header to a Provider Bridging packet. In these embodiments, the packet received from the customer network may include an S-tag. The service provider's network may then add a TRILL header to the packet. In some embodiments, the system may ensure that the priority bits in the outermost VLAN tag are the same as the priority bits in the S-tag.

Internal Virtual Network Identifier

When a packet is received on an input port, the packet header is processed by the switch to determine the output port on which the packet is to be forwarded. Oftentimes, the forwarding mechanism (e.g., an integrated circuit specifically designed for performing forwarding lookups) is the bottleneck in the data path. Consequently, increasing the processing speed and decreasing the size and complexity of the forwarding mechanism is usually very important.

One approach for supporting network virtualization in an RBridge is to directly use the VPN identifier and/or other fields in the packet header to perform forwarding lookup. Unfortunately, this approach can require the forwarding mechanism to use a large number of bits to perform the forwarding lookups. As a result, it can be very costly to design a switch that performs forwarding using this approach.

Some embodiments of the present invention determine an internal virtual network identifier based on the port on which a packet is received and/or one or more fields (which may include the VPN identifier) in the packet. Next, the packet is forwarded based on the internal virtual network identifier. The length (in terms of bits) of the internal virtual network identifier can be less than the combined length of the one or more fields in the packet's header that are used for determining the internal virtual network identifier. This reduction in length can increase the processing speed of the forwarding mechanism, and decrease the overall size and complexity of the implementation.

There are at least two non-obvious insights that allow us to map the one or more fields in the packet's header to a shorter sized internal virtual network identifier without significantly affecting network virtualization functionality. The first non-obvious insight is that, even though each customer is given the capability to create a large number of virtual networks, it is unlikely that each and every customer will provision a large number of virtual networks. For example, even though each customer may be given the capability to create 4K VLANs, it is unlikely that each and every customer will provision 4K VLANs. Hence, the internal virtual network identifier does not have to be long enough to handle cases in which each customer provisions 4K VLANs. Note that the entire 4K VLAN address space is still available to each customer.

The second non-obvious insight is that multiple virtual networks can be mapped to a single internal virtual network identifier. Note that an RBridge needs to assign a unique internal virtual network identifier for a virtual network if the RBridge needs to forward packets to a customer on a local port. For example, an ingress or egress RBridge may assign a unique internal virtual network identifier for each virtual network whose packets are forwarded to a customer-facing port on the RBridge. However, if the RBridge is not an ingress or egress RBridge for a set of virtual networks, then the RBridge can map the set of virtual networks to a common "pass-through" internal virtual network identifier. For example, the RBridge can map multiple (VLAN identifier, VPN identifier) tuples to the same internal virtual network identifier if the RBridge is not an ingress or egress RBridge for these (VLAN identifier, VPN identifier) tuples.

FIG. 3 illustrates examples of mappings between packet header information and internal virtual network identifiers in accordance with some embodiments of the present invention.

As mentioned above, the port on which a packet is received and/or one or more fields in the packet's header can be mapped to an internal virtual network identifier. The mappings shown in FIG. 3 map a (VLAN identifier, VPN identifier) tuple from a packet's header to an internal virtual network identifier. The mappings shown in FIG. 3 are for illustration purposes only and are not intended to limit the present invention to the forms disclosed.

The mappings illustrated in FIG. 3 may correspond to RBridges 102, 104, 106, 108, and 110 in FIG. 1. The mapping on RBridge 106 may map (VLAN identifier, VPN identifier) tuples 306 and 308 to internal virtual network identifiers IVNID-01 and IVNID-02, respectively. The mapping on RBridge 108 may map tuples 306, 308, and 310 to internal virtual network identifiers IVNID-03, IVNID-04, and IVNID-05, respectively. The mapping on RBridge 110 may map tuples 302, 304, and 310 to internal virtual network identifiers IVNID-06, IVNID-07, and IVNID-08, respectively.

The mapping on RBridge 102 may map tuples 302 and 304 to internal virtual network identifiers IVNID-09 and IVNID-10, respectively. If the traffic associated with tuples 306, 308, and 310 passes through RBridge 102, these tuples may be mapped to a common internal virtual network identifier, namely, IVNID-11. If all traffic passes through RBridge 104, the RBridge may map all tuples to a common internal virtual network identifier, namely, IVNID-12.

In some embodiments, the scope of internal virtual network identifiers does not extend beyond an RBridge. Hence, different RBridges may map the same tuple to different internal virtual network identifiers. For example, the tuple 306 is mapped to internal virtual network identifiers IVNID-01, IVNID-03, IVNID-11, and IVNID-12 on RBridges 106, 108, 102, and 104, respectively.

When RBridge 106 receives a packet on port P1 whose header information includes tuple 306, it can use the mapping shown in FIG. 3 to determine the associated internal virtual network identifier, namely, IVNID-01. Next, RBridge 106 can forward the packet based on IVNID-01. Specifically, RBridge 106 can perform a forwarding lookup using IVNID-01 as the key. The result of the lookup operation may indicate that a TRILL header is to be added to the packet to obtain a TRILL packet, and that the resulting TRILL packet is to be forwarded to RBridge 102. At RBridge 102, the TRILL packet may be forwarded to RBridge 108 based on the TRILL header.

Note that RBridge 102 may determine an internal virtual network identifier (e.g., IVNID-11) based on the header information. However, since the packet has a TRILL header, the internal virtual network identifier may be ignored by RBridge 102 for purposes of forwarding the packet (assuming that the packet is not destined for VLANs 112 or 114).

When the packet is received at RBridge 108, an internal virtual network identifier (e.g., IVNID-03) may be determined based on the header information. Next, the internal network identifier may be used to perform a forwarding lookup. The result of the lookup operation may indicate that the packet is to be forwarded on port P1 to VLAN 116. Accordingly, RBridge 108 may forward the packet on port P1 to VLAN 116.

Per-Virtual-Network Flooding

If a forwarding lookup operation fails, a switch may flood the packet to ensure that the packet reaches its intended destination. Unfortunately, flooding can consume a large amount of network resources. Therefore, it is generally desirable to limit the extent of flooding if possible.

In an IVNID based approach, packets from multiple virtual networks (e.g., VPNs or VLANs) may be mapped to the same IVNID value. For example, in FIG. 3, (VLAN identifier, VPN identifier) tuples 306, 308, and 310 are mapped to the same IVNID value on RBridge 102. In one approach, if a forwarding lookup operation for a packet fails, the switch may flood the packet to at least those virtual networks that map to the IVNID for the packet. For example, if a forwarding lookup operation on Rbridge 102 fails for a packet associated with IVNID-11, Rbridge 102 may flood the packet at least on all ports that are associated with tuples 306, 308, and/or 310.

Flooding a packet on more virtual networks than necessary can waste networking resources. Therefore, in some embodiments of the present invention, flooding is performed on a per-virtual-network basis. Specifically, in some embodiments, filtering at the ports is performed based on the VPN identifier, and if the packet does not include a VPN identifier field, a VPN identifier can be determine based on other fields in the packet (e.g., the VPN identifier can be determined based on the S-VLAN identifier). For example, RBridge 102 can determine a set of egress ports based on an IVNID. Next, RBridge 102 can provide a copy of the packet to the set of egress ports. Each egress port can then flood the packet only if the virtual network identifier in the packet (e.g, a VPN identifier in the TRILL header or a VPN identifier that is determined based on other fields in the packet) is associated with the egress port. In other words, once the packet has been provided to the set of egress ports based on the IVNID, the egress ports can then filter packets based on a virtual network identifier field in the packets. For example, as shown in FIG. 3, all packets are mapped to IVNID-12 on RBridge 104. In this case, if the forwarding lookup fails, the packet can be provided to all egress ports on RBridge 104. Each egress port can then flood the packet depending on whether or not the egress port is associated with the virtual network identifier in the packet.

Figure 4:
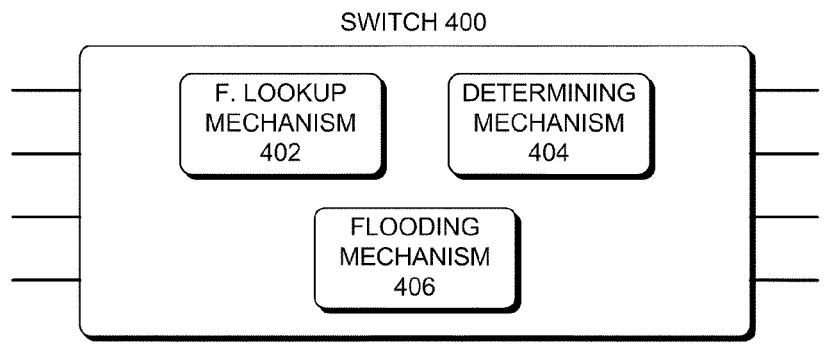
FIG. 4 illustrates a switch in accordance with some embodiments of the present invention.

FIG. 4 illustrates a switch in accordance with some embodiments of the present invention.

Switch 400 can include a plurality of mechanisms which may communicate with one another via a communication channel, e.g., a bus. Switch 400 may be realized using one or more integrated circuits. In some embodiments, switch 400 is an RBridge (e.g., RBridge 102) which includes forwarding lookup mechanism 402, determining mechanism 404, and flooding mechanism 406. In some embodiments, these mechanisms may be part of an application-specific integrated circuit.

Forwarding lookup mechanism 402 may be configured to perform a forwarding lookup operation based on one or more fields in a packet's header. The one or more fields in the packet's header can include, but are not limited to, a customer VLAN identifier, a service provider VLAN identifier, a source MAC address, a destination MAC address, an ingress RBridge nickname, and an egress RBridge nickname. In some embodiments, forwarding lookup mechanism 402 may be configured to perform a look up using a content-addressable memory.

Switch 400 may determine an internal virtual network identifier for a packet (e.g., Ethernet packet) based on the port on which the packet is received and/or one or more fields in the packet's header. The switch and/or port configuration can dictate which fields are used to determine the internal virtual network identifier. For example, one port of a switch may be configured to map all packets to a particular internal virtual network identifier. Another port of the switch may be configured to map a set of C-VLAN-identifiers to a corresponding set of internal virtual network identifiers, and assign a default internal virtual network identifier to a packet if the C-VLAN-identifier is not in the set of C-VLAN-identifiers.

If the forwarding lookup operation is successful, switch 400 may forward the packet based on the result of the forwarding lookup operation and the internal virtual network identifier. The switch may include a table (e.g., an array in memory) which is indexed using the internal virtual network identifier. Each record in the table (e.g., an array element) can include information that is used for forwarding the packet. For example, the record may include instructions and/or information for modifying one or more fields in the header (e.g., the record may indicate that VLAN translation is to be performed and specify the new VLAN identifier). Additionally, the record may indicate the header fields that need to be added to the packet (e.g., a TRILL header). Once the packet is provided to the egress ports, the system can determine the encapsulation for the packet. Specifically, at the egress port the system can determine whether to send the packet through the egress port with a C-tag, an S-tag, a TRILL header, and/or a TRILL option field that contains a VPN identifier. The system can also perform translation operations, such as translating a C-tag, an S-tag, and/or a VPN identifier.

However, if the forwarding lookup operation fails, determining mechanism 404 may determine a set of egress ports based on a virtual network identifier in the packet's header. For example, the system can determine the set of egress ports based on a VLAN identifier in a VLAN tag or a VPN identifier in a TRILL option field, or a combination thereof.

Flooding mechanism 406 may be configured to flood the packet over the set of egress ports. Since flooding is performed on a set of egress ports that were determined based on a virtual network identifier in the packet's header, the flooding is more efficient than approaches that flood the packet over all ports regardless of whether or not a particular node in the network belongs to the virtual network associated with the packet.

In some embodiments, the packet is flooded by forwarding the packet over a multicast tree which may be determined based on the virtual network identifier in the packet's header. Specifically, switch 400 can create a TRILL multicast packet whose header includes a multicast tree identifier. Next, switch 400 can forward the TRILL multicast packet over the set of egress ports associated with the multicast tree identifier. In some embodiments, the multicast tree identifier is a nickname of an RBridge that is the root of the multicast tree.

Note that FIG. 4 is for illustration purposes only, and is not intended to limit the present invention to the forms disclosed. In some embodiments, switch 400 may not be an RBridge, and/or may include fewer or more mechanisms than those shown in FIG. 4.

In some embodiments, determining mechanism 404 may determine a set of egress ports based on an IVNID associated with the packet, and/or one or more fields in the packet's header. Next, flooding mechanism 406 can provide a copy of the packet to each egress port in the set of egress ports. Flooding mechanism 406 can then flood a copy of the packet over an egress port only if a virtual network identifier in the packet is associated with the egress port. For example, if an egress port is not coupled to a customer network that is associated with the virtual network identifier, then the egress port may filter out the packet.

Figure 5:
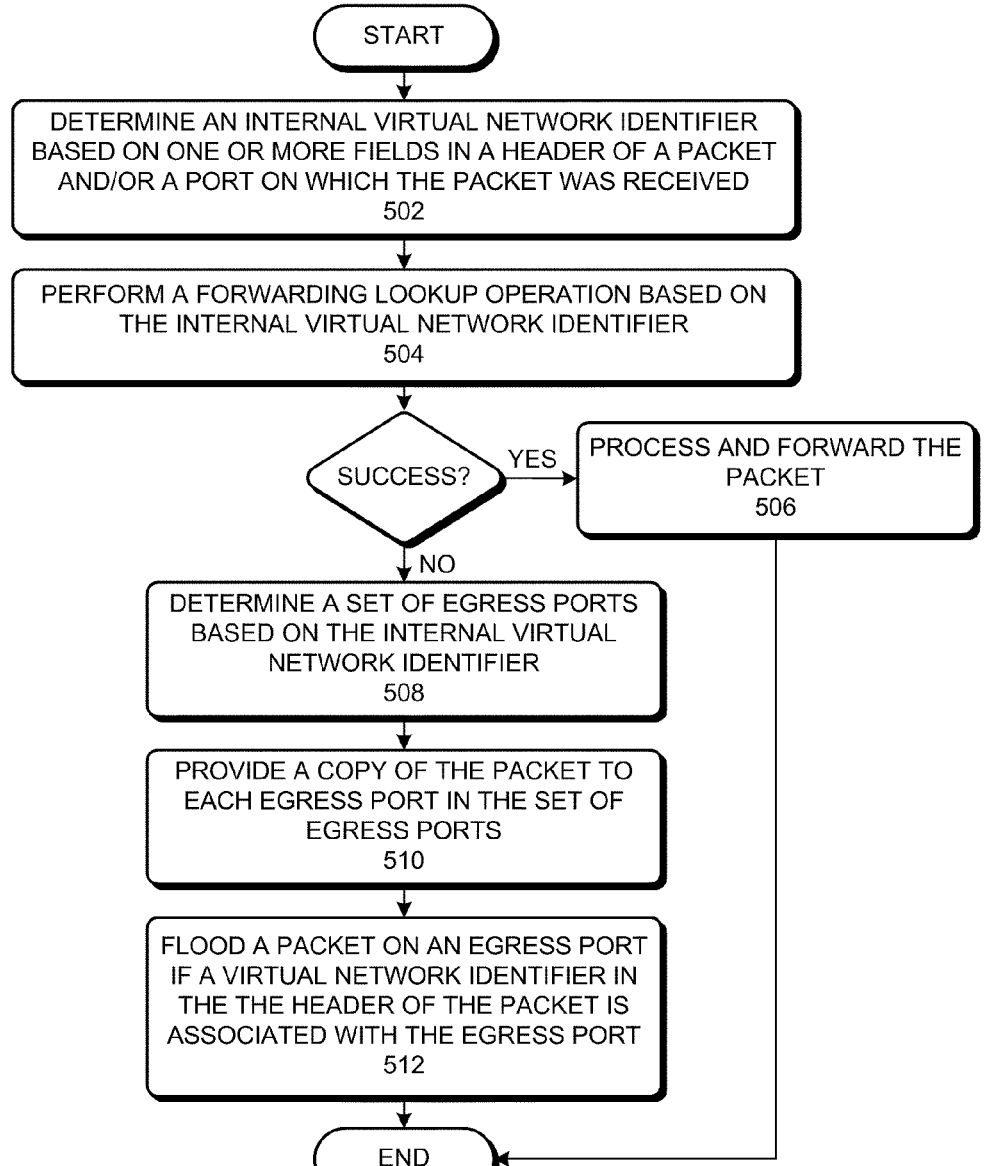
FIG. 5 presents a flowchart that illustrates a process for flooding packets on a per-virtual-network basis in accordance with some embodiments of the present invention.

FIG. 5 presents a flowchart that illustrates a process for flooding packets on a per-virtual-network basis in accordance with some embodiments of the present invention.

The process can be performed by a switch, e.g., RBridge 102. Upon receiving a packet, the switch can determine an internal virtual network identifier based on one or more fields in a packet and/or a port on which the packet was received (operation 502). Next, the system can perform a forwarding lookup operation based on the internal virtual network identifier (operation 504).

If the forwarding lookup operation succeeds, the switch can process and forward the packet accordingly (operation 506). However, if the forwarding lookup operation fails, the switch can determine a set of egress ports based on the internal virtual network identifier (operation 508). Next, the switch can provide a copy of the packet to each egress port in the set of egress ports (operation 510). The system can then flood a packet on an egress port if a virtual network identifier in the header of the packet is associated with the egress port (operation 512). For example, the system can flood a packet on an egress port if a VPN identifier in the packet indicates that the egress port is coupled to a virtual network associated with the VPN identifier.

Figure 6:
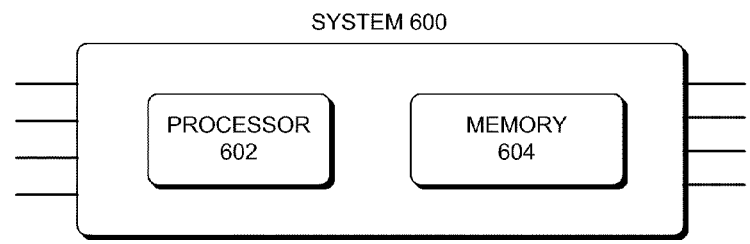
FIG. 6 illustrates a system in accordance with some embodiments of the present invention.

FIG. 6 illustrates a system in accordance with some embodiments of the present invention.

System 600 can include processor 602 (e.g., a network processor) and memory 604. Processor 602 may be capable of accessing and executing instructions stored in memory 604. For example, processor 602 and memory 604 may be coupled by a bus. Memory 604 may store instructions that when executed by processor 602 cause system 600 to perform the process illustrated in FIG. 5. Specifically, in some embodiments, memory 604 may store instructions for performing a forwarding lookup operation based on one or more fields in a packet's header, determining a set of egress ports based on a virtual network identifier in the packet's header if the lookup operation fails, and flooding the packet over the set of egress ports.

Figure 7:
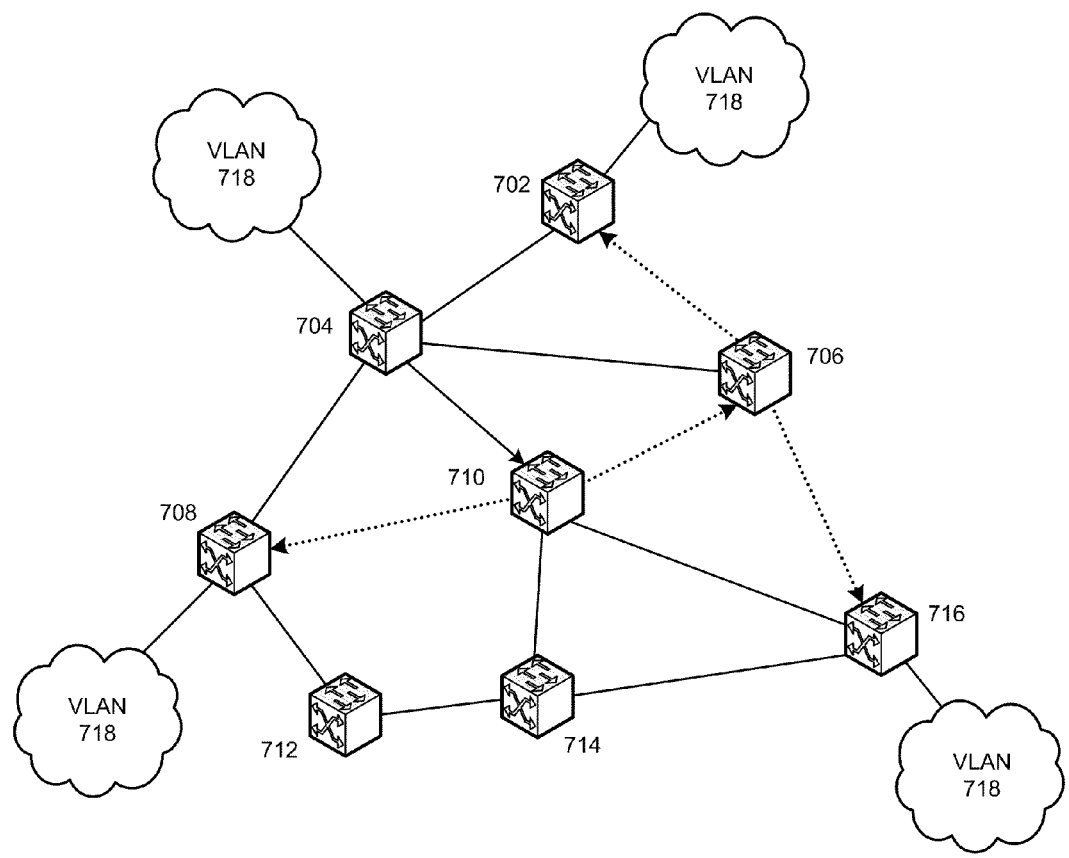
FIG. 7 illustrates how flooding can be performed on a per-virtual-network basis in accordance with some embodiments of the present invention.

FIG. 7 illustrates how flooding can be performed on a per-virtual-network basis in accordance with some embodiments of the present invention.

RBridges 702-716 can be in a TRILL network. RBridges 702, 708, and 716 can be coupled to customer networks that are part of the same virtual network. For example, RBridges 702, 704, 708, and 716 may be coupled to VLAN 718 at different customer sites. Suppose RBridge 710 receives a packet from RBridge 704 that includes a VLAN identifier associated with VLAN 718. If a forwarding lookup operation for the packet fails at RBridge 710, RBridge 710 can encapsulate the packet in a TRILL multicast packet, and forward the TRILL multicast packet over the multicast tree, as shown in FIG. 7 using dotted lines.

Note that the TRILL multicast tree is rooted at RBridge 710. In some embodiments, the TRILL multicast packet header can include a field (e.g., multicast field 250 in FIG. 2) which indicates that the packet is a multicast packet. Further, the TRILL multicast packet header can include a multicast tree identifier as the egress RBridge nickname which identifies the multicast tree over which the TRILL multicast packet is to be forwarded. For example, the egress RBridge 256 field in FIG. 2 can be used as the multicast tree identifier by setting it to be the nickname of an RBridge which is the root of the multicast tree.

The data structures and code described in this disclosure can be partially or fully stored on a non-transitory computer-readable storage medium and/or a hardware module and/or a hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other non-transitory media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed. Specifically, the methods and/or processes may be described in a hardware description language (HDL) which may be compiled to synthesize register transfer logic (RTL) circuitry which can perform the methods and/or processes.

The methods and processes described in this disclosure can be partially or fully embodied as code and/or data stored in a computer-readable storage medium or device, so that when a computer system reads and/or executes the code and/or data, the computer system performs the associated methods and processes. The methods and processes can also be partially or fully embodied in hardware modules or apparatuses, so that when the hardware modules or apparatuses are activated, they perform the associated methods and processes. Further, the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A switch, comprising:
one or more ports;
lookup circuitry configured to determine an internal virtual network identifier for a packet based on an entry in a data structure in a local storage device, wherein the entry maps a virtual local area network (VLAN) identifier and a Virtual Private Network (VPN) identifier associated with the packet to the internal virtual network identifier;
determining circuitry configured to, in response to determining that the packet needs flooding, determine a set of egress ports from the one or more ports for flooding the packet based on the internal virtual network identifier; and
flooding circuitry configured to:
determine whether to filter the packet for flooding at a first port in the set of egress ports based on whether the first port is associated with the VPN identifier;
in response to determining not to filter the packet, associate the packet with the first port as an output port.

2. The switch of claim 1, wherein the determining circuitry is further configured to determine the internal virtual network identifier based on one or more of:
one or more fields in a header of the packet; and
a port on which the packet has been received.

3. The switch of claim 1, wherein the VLAN identifier in the entry is a customer VLAN identifier.

4. The switch of claim 1, wherein the VLAN identifier in the entry is a service provider VLAN identifier.

5. The switch of claim 1, wherein the flooding circuitry is further configured to filter the packet for flooding at a second port in the set of egress ports in response to the second port not being associated with the VPN identifier.

6. The switch of claim 5, wherein the flooding circuitry, in response to filtering the packet for flooding at the second port, is further configured to preclude the second port from being an output port for the packet.

7. The switch of claim 1, wherein the entry further maps a media access control (MAC) address of the packet to the internal virtual network identifier.

8. The switch of claim 1, wherein the packet is a packet in a routed network, and wherein the VPN identifier is in a header of the packet associated with the routed network.

9. The switch of claim 1, wherein packets from a plurality of virtual networks are mapped to the internal virtual network identifier; and
wherein the determining circuitry is further configured to determine a set of egress ports for the packets from the plurality of virtual networks based on the internal virtual network identifier.

10. A system, comprising:
a processor; and
a memory storing instructions that when executed by the processor cause the system to perform a method, the method comprising:
determining an internal virtual network identifier for a packet based on an entry in a data structure in a local storage device, wherein the entry maps a virtual local area network (VLAN) identifier and a Virtual Private Network (VPN) identifier associated with the packet to the internal virtual network identifier;
in response to determining that the packet needs flooding, determining a set of egress ports for flooding the packet based on the internal virtual network;
determining whether to filter the packet for flooding at a first port in the set of egress ports based on whether the first port is associated with the VPN identifier; and
in response to determining not to filter the packet, associating the packet with the first port as an output port.

11. The system of claim 10, wherein the method further comprises determining the internal virtual network identifier based on one or more of:
one or more fields in a header of the packet; and
a port on which the packet has been received.

12. The system of claim 10, wherein the VLAN identifier in the entry is a customer VLAN identifier.

13. The system of claim 10, wherein the VLAN identifier in the entry is a service provider VLAN identifier.

14. The system of claim 10, wherein the method further comprises filtering the packet for flooding at a second port in the set of egress ports in response to the second port not being associated with the VPN identifier.

15. The system of claim 14, wherein the method further comprises, in response to filtering the packet for flooding at the second port, precluding the second port from being an output port for the packet.

16. The system of claim 10, wherein the entry further maps a media access control (MAC) address of the packet to the internal virtual network identifier.

17. The system of claim 10, wherein the packet is forwardable in a routed network, and wherein the VPN identifier is in a header of the packet associated with the routed network.

18. The system of claim 10, wherein packets from a plurality of virtual networks are mapped to the internal virtual network identifier; and
wherein the method further comprises determining a set of egress ports for the packets from the plurality of virtual networks based on the internal virtual network identifier.

19. A method, comprising:
determining, by a computing system, an internal virtual network identifier for a packet based on an entry in a data structure in a local storage device, wherein the entry maps a virtual local area network (VLAN) identifier and a Virtual Private Network (VPN) identifier associated with the packet to the internal virtual network identifier;
in response to determining that the packet needs flooding, determining a set of egress ports for flooding the packet based on the internal virtual network identifier;
determining whether to filter the packet for flooding at a first port in the set of egress ports based on whether the first port is associated with the VPN identifier; and in response to determining not to filter the packet, associating the packet with the first port as an output port.

20. The method of claim 19, further comprising determining the internal virtual network identifier based on one or more of:
   one or more fields in a header of the packet; and
   a port on which the packet has been received.

21. The method of claim 20, wherein the VLAN identifier in the entry is one or more of:
   a customer VLAN identifier; and
   a service provider VLAN identifier.

22. The method of claim 19, wherein the packet is forwardable in a routed network, and wherein the VPN identifier is in a header of the packet associated with the routed network.

23. The method of claim 19, wherein packets from a plurality of virtual networks are mapped to the internal virtual network identifier.

24. The method of claim 19, further comprising:
   filtering the packet for flooding at a second port in the set of egress ports in response to the second port not being associated with the VPN identifier; and
   in response to filtering the packet for flooding at the second port, precluding the second port from being an output port for the packet.

* * * * *